United States Patent [19]

Dart et al.

[11] 4,124,880
[45] Nov. 7, 1978

[54] ROTATING SIGNAL LIGHT

[75] Inventors: Larry K. Dart, Costa Mesa; Richard L. Stalder, Fountain Valley, both of Calif.

[73] Assignee: International Telephone and Telegraph Corporation, New York, N.Y.

[21] Appl. No.: 695,305

[22] Filed: Jun. 11, 1976

[51] Int. Cl.² ............................................. F21M 7/00
[52] U.S. Cl. ................................................... 362/35
[58] Field of Search .................. 240/7.1 R, 10.1, 41 R, 240/49, 41 SB; 340/50, 87

[56] References Cited

U.S. PATENT DOCUMENTS

| | | | |
|---|---|---|---|
| 2,595,770 | 5/1952 | Crossley et al. | 240/49 |
| 2,984,738 | 5/1961 | Belau | 240/49 |
| 3,117,302 | 1/1964 | Cardarelli et al. | 240/49 |
| 3,133,263 | 5/1964 | Norberg | 240/49 |
| 3,271,735 | 9/1966 | Gosswiller | 240/49 X |
| 3,784,809 | 1/1974 | Smith | 240/49 |

*Primary Examiner*—L. T. Hix
*Assistant Examiner*—Alan Mathews
*Attorney, Agent, or Firm*—Thomas L. Peterson

[57] ABSTRACT

A rotating signal light for emergency vehicles in which a plastic lamp holder is mounted on a vertically disposed rotatable shaft. Upper and lower contact plates are mounted on the top and bottom of the lamp holder. The contact plates have spring contact fingers which engage the terminals on the lamps mounted on the holder. The bottom plate also constitutes a slip ring which is engaged by a brush mounted on the support for the shaft. A pushnut mounted on the top of the drive shaft has a frictional engagement with the upper contact plate for driving the plate and, hence, the lamp holder. The lamp holder has a symmetrical notched configuration allowing two of such holders to be mated, one inverted and rotated 90° relative to the other, so that the holder assembly may mount four lamps.

11 Claims, 6 Drawing Figures

ROTATING SIGNAL LIGHT

BACKGROUND OF THE INVENTION

The present invention relates generally to signal lights and, more particularly, to an improved construction for a rotating signal or warning light of the type used on police and fire department vehicles, emergency road vehicles, ambulances, and the like.

U.S. Pat. No. 3,117,302 to Cardarelli discloses a rotating signal light in which a metallic lamp holder is fixedly attached to a vertical shaft. The shaft carries a worm gear which is driven by a worm fixed to the shaft of a motor mounted in the base of the light. Electrical connections are made by the terminals of the lamps mounted on the lamp holder by either wires, or metallic plates, which are connected to the terminals by screws. The wires may also be electrically connected to the terminals by soldering. One of the conductors to the terminals of the lamps is connected to the drive shaft for the lamp holder which is in turn connected to ground. The other conductor must be separated from the shaft and the metallic lamp holder by means of separate insulators. Reference is also made to U.S. Pat. No. 3,271,735 to Gosswiller which discloses a similar type of rotatable signal light which utilizes a metallic lamp holder. The prior art rotatable lights require a large number of parts, thereby increasing the manufacturing costs of the lights and the cost of maintaining an inventory of parts. Further, in the prior art constructions a slip ring is fixedly mounted below the rotating lamp holder and a brush is mounted on the holder for slidably engaging the slip ring. As a result, if contaminants fall on the top of the slip ring, the electrical connection between the ring and the brush may be adversely affected.

The purpose of the present invention is to provide a rotatable signal light which is simpler in design, utilizes a fewer number of parts, and therefore less expensive to produce and assemble than the aforementioned prior art signal lights. Further, it is an object of the invention to overcome the problem of contaminants falling on the slip ring. In addition, another purpose of the invention is to provide a signal light which is readily adaptable by the use of identical components to mount four lamps rather than two.

SUMMARY OF THE INVENTION

According to the principal aspect of the present invention, there is provided a rotating signal light in which an insulative lamp holder is mounted on a rotatable vertically disposed shaft. The holder has a plurality of lamp receiving receptacles thereon. Upper and lower contact plates are mounted on the lamp holder. A driving connection is provided between the vertical shaft and the lamp holder. A sliding electrical connection is provided to the lower contact plate. The contact plates have spring contact fingers adjacent to the receptacles for electrically, resiliently engaging the terminals on the lamps mounted in the receptacles. The contact plates are preferably identical, and therefore interchangeable, thereby facilitating assembly. Since the contact plates resiliently engage the terminals on the lamps, there is no requirement for separate screws, or soldering operations, to make electrical connections to the terminals. In a preferred embodiment, the lower contact plate constitutes a slip ring which is engaged by a brush mounted on a fixed support for the drive shaft, while the upper contact plate is engaged by a pushnut mounted on the drive shaft so that a frictional driving connection is provided between the shaft and the lamp holder. This arrangement requires only a minimum number of parts, thereby reducing assembly and inventory costs and, therefore, constitutes a significant advantage over the prior art signal lights discussed hereinabove.

According to another aspect of the invention, there is provided a pair of identical, symmetrical notched lamp holders which are mated together, one inverted and rotated 90° relative to the other. The lamp holder assembly is capable of mounting four lamps, rather than two lamps as when utilizing only a single lamp holder. Pairs of upper and lower contact plates are mounted on the assembly for making electrical connection to the lamps mounted on the ends of the lamp holders. Thus, the same components utilized for making a two lamp rotating signal light may be utilized for making a four lamp signal light.

DESCRIPTION OF THE PREFERRED EMBODIMENT

Figure 1:
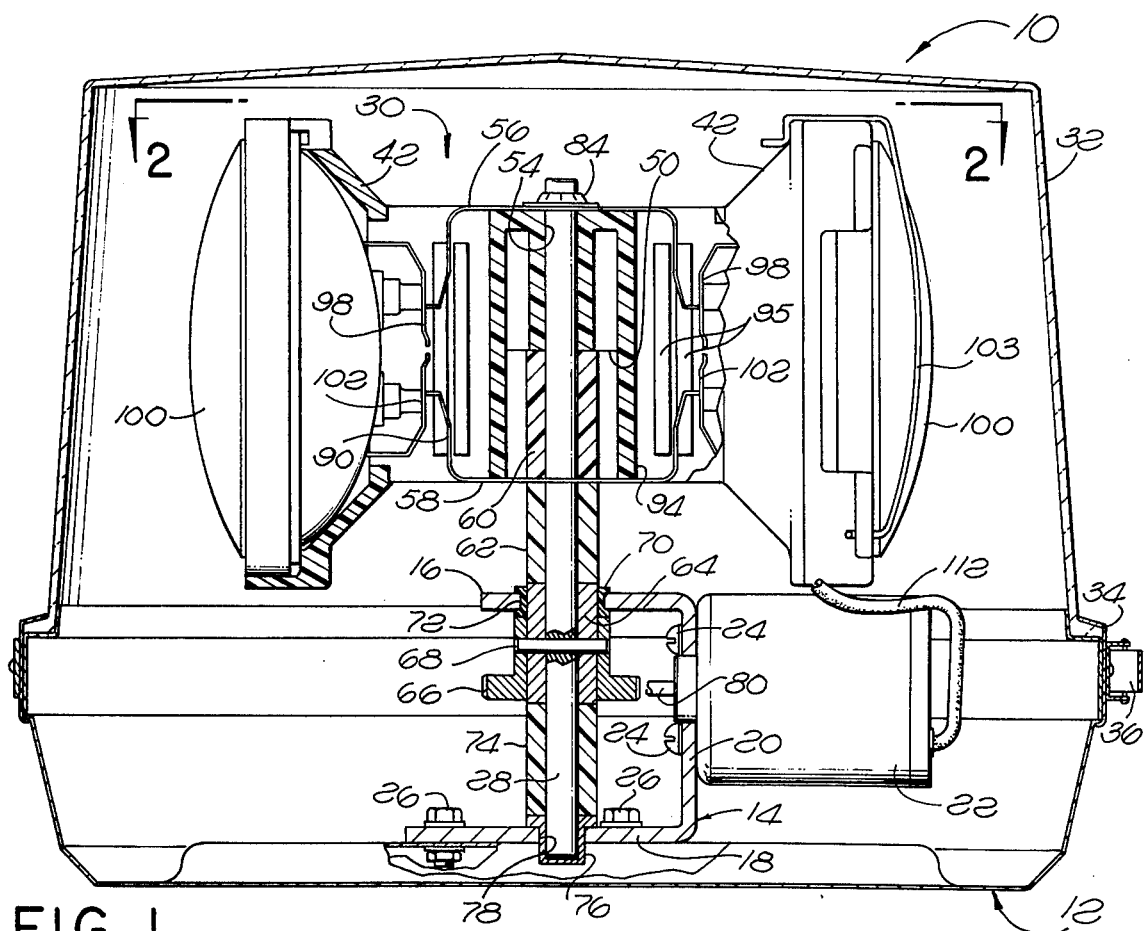
FIG. 1 is a partial vertical sectional view taken through the center of a signal light embodying the novel features of the present invention.

Referring now to the drawings in detail, there is illustrated in FIG. 1 the signal light of the present invention, generally designated 10. The light comprises a circular base 12 having a bracket 14 mounted thereon. The bracket has a generally U-shaped configuration and includes an upper leg 16, a lower leg 18 and a vertical connecting leg 20. A motor 22 is mounted on the connecting leg 20 by screws 24 or the like. The lower leg 18 is fixed to the bottom of the base 12 by means of bolts 26.

A vertical shaft 28 is rotatable in the motor bracket 14. A lamp assembly, generally designated 30, is rotatably mounted on the upper portion of the shaft 28. A transparent plastic dome 32 covers the lamp assembly 30. A clamping ring 34 connects the dome to the base 12. A latch element 36 is provided on the clamping ring to tightly secure the dome to the base.

Figure 3:
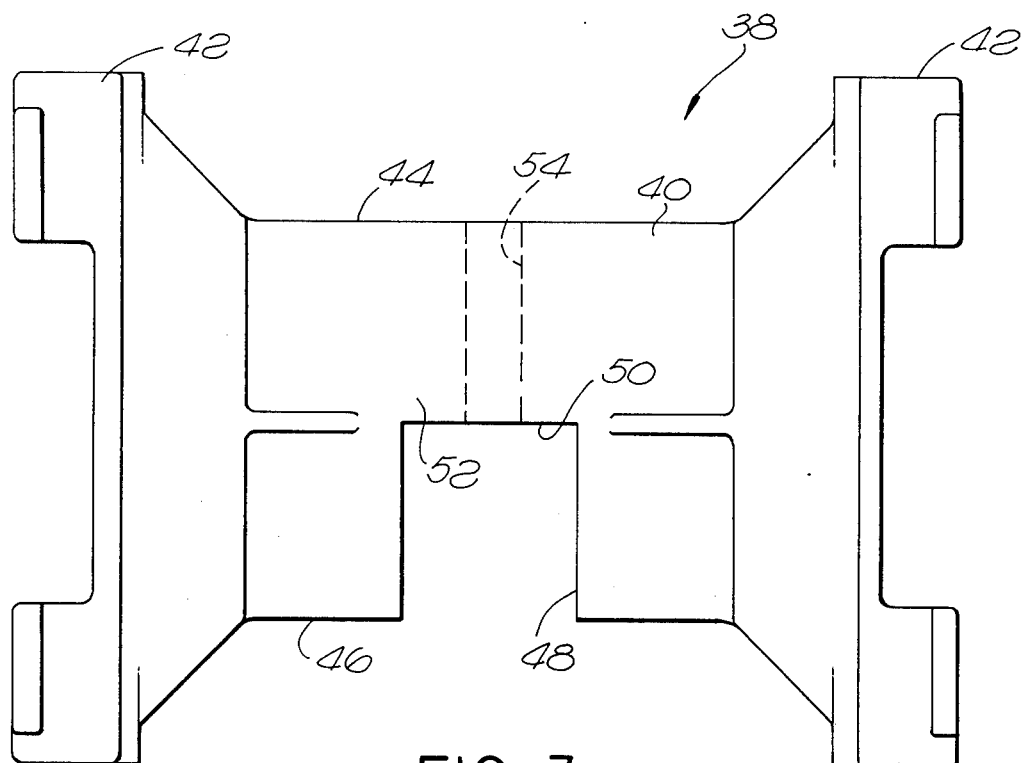
FIG. 3 is a side elevational view of the lamp holder illustrated in FIG. 1.
Figure 4:
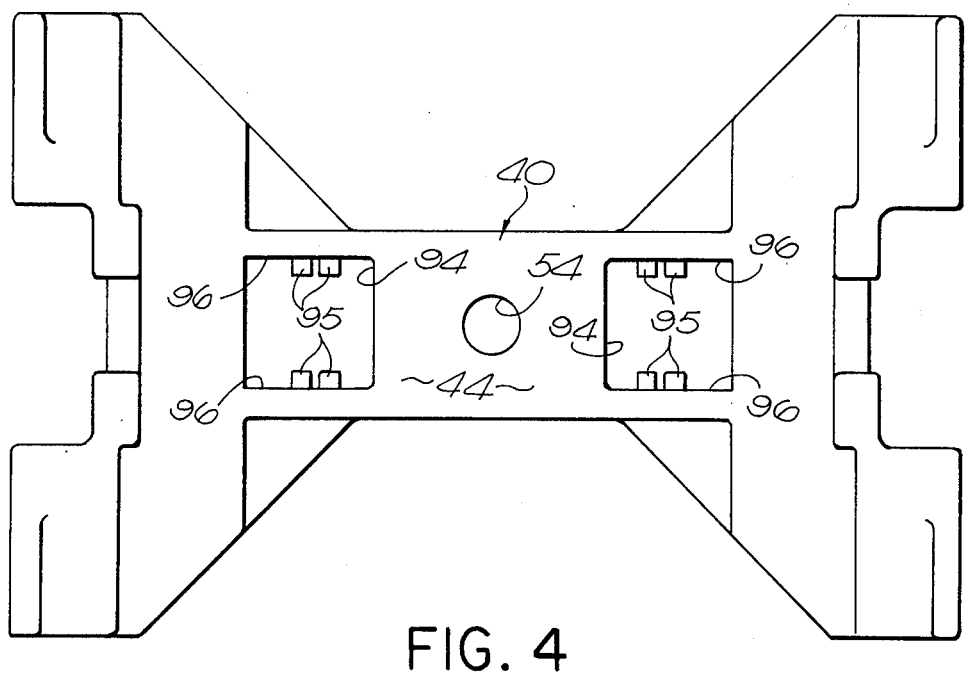
FIG. 4 is a top plan view of the lamp holder.

As best seen in FIGS. 3 and 4, the lamp assembly 30 includes a symmetrical, notched lamp holder, generally designated 38. The lamp holder is formed of insulative material and preferably is a one-piece molded plastic part. The holder is generally elongated and includes a central region 40 of rectangular cross-section, and two lamp receptacles 42 formed at the opposite ends of the central region. The central region of the holder has a flat upper surface 44 and a flat lower surface 46 parallel to the surface 44. A downwardly opening recess 48 is formed in the central region of the holder. The top 50 of the recess lies on the center line of the holder. The part of the holder above the recess 48, as viewed in FIG. 3, provides a central mounting portion 52, which has a vertical bore 54 extending therethrough. The bore receives the draft shaft 28 and is dimensioned so that the lamp holder is rotatable on the shaft.

An upper contact plate 56 is mounted on the upper surface 44 of the lamp holder while a lower contact plate 58 is mounted on the lower surface of the holder. The contact plates are formed of a suitable spring metal, such as beryllium copper. The contact plates are nonrotatable relative to the lamp holder 38, but are rotatable relative to the shaft 28. A plastic cylindrical sleeve, or spacer, 60 is rotatably mounted on the shaft 28 in the recess 48. The lower end of the spacer 60 engages the lower contact plate 58 while the upper end of the spacer engages the top 50 of the recess. A second plastic spacer 62 is mounted on the shaft 28 below the lower contact plate 58. The spacer 62 rests on the top of a cylindrical bearing 64 preferably formed of bronze. A worm gear 66 surrounds the bearing 64. A transversely extending pin 68 non-rotatably connects the bearing 64 and worm gear 66 to the shaft 28. A fixed split nylon bearing 70 is mounted in a circular opening 72 in the upper leg 16 of the motor bracket 14. The bronze bearing 64 is rotatable relative to the nylon bearing 70. An additional plastic spacer 74 is mounted on the shaft 28 below the bearing 64. The spacer 74 rests on top of a cup-shaped bronze bearing 76 which is seated in an opening 78 in the lower leg 18 of the motor bracket. Thus, the cup-shaped bearing 76 and the lower leg of the motor bracket support the entire weight of the rotatable lamp assembly 30.

The motor 22 has a horizontally extending drive shaft 80 which carries a worm 82 that engages the worm gear 66 fixedly attached to the shaft 28. The worm and worm gear thereby provide a driving connection between the motor 22 and the shaft 28 so that the shaft may rotate about its longitudinal axis.

An arched push nut 84 is pressed onto the upper end of the shaft 28 above the rotatable lamp assembly 30. The upper portion of the push nut has an interference fit with the shaft 28 so as to rotate therewith. The lower portion of the push nut frictionally engages the upper contact plate 56. Since the contact plate is nonrotatable relative to the holder 38, when the shaft 28 is driven by the motor 22 the holder will be frictionally driven by the pushnut. The frictional drive for the lamp assembly 30 permits the user to shift the lamp holder manually to a convenient position on the top of a vehicle so that the lamps thereon may be easily replaced. It will be appreciated that the pushnut 84 constitutes the sole means for retaining the lamp assembly 30 on the shaft 28, and for retaining the contact plates on the lamp holder. No separate fastener elements are required.

Figure 5:
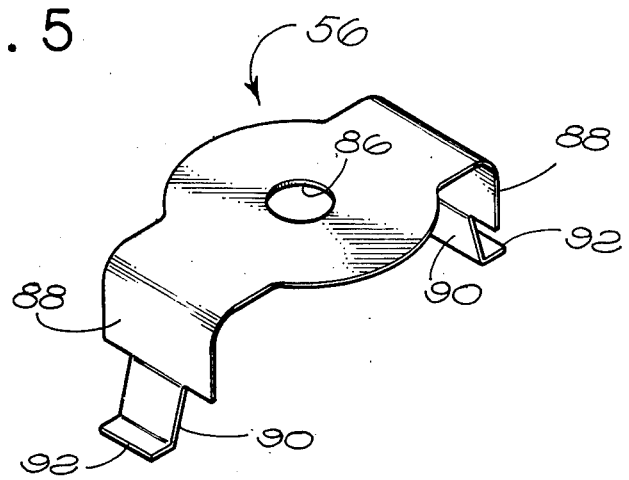
FIG. 5 is a perspective view of one of the contact plates employed in the signal light illustrated in FIG. 1.
Figure 6:
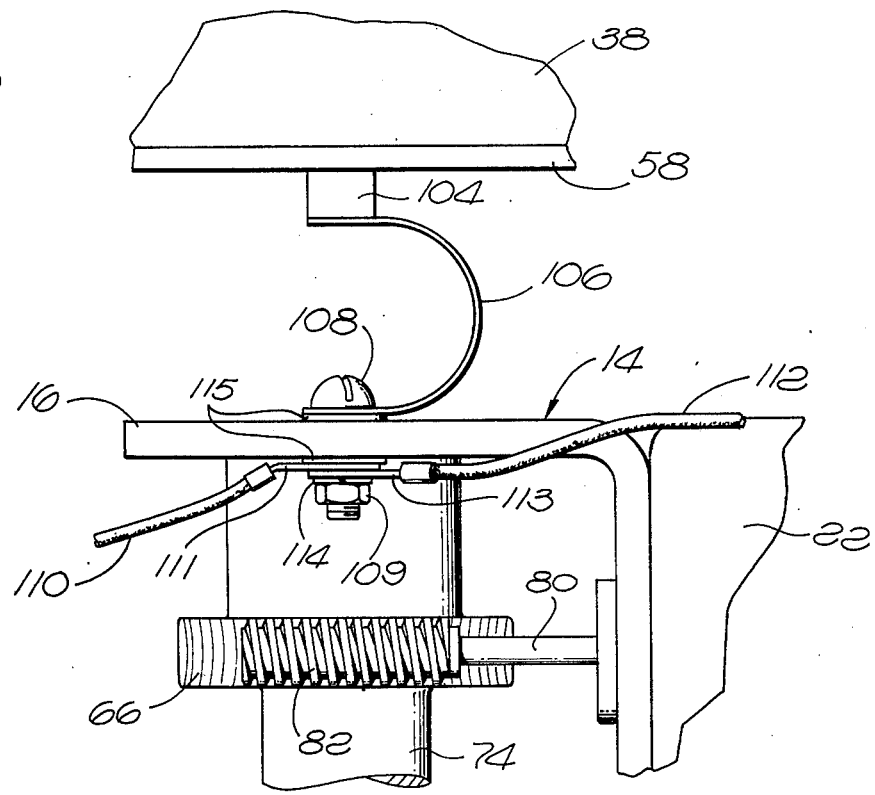
FIG. 6 is a fragmentary, side elevational view showing the worm gear driving arrangement and the brush assembly employed in the signal light illustrated in FIG. 1.

Preferably, the upper and lower contact plates 56 and 58 are identical. Reference is now made to FIG. 5 which illustrates the plate 56. The plate has a circular configuration with a central hole 86 therein having a diameter greater than the diameter of the shaft 28. The plate embodies integral, diametrically opposed, outwardly extending arms 88. Each of the arms is bent vertically downwardly and has formed at its lower end an integral spring contact finger 90. The fingers 90 extend outwardly an an angle of approximately 45°, and terminate in horizontal end segments 92.

As best seen in FIG. 4, two vertical openings 94 are formed in the central region 40 of the lamp holder 38. Parallel, spaced, vertical ribs 95 are formed on the opposed flat sides 96 of each opening 94. When the contact plate 56 is mounted on the top of the lamp holder 38, the downwardly bent arms 88 thereof slide into the spaces between the vertical ribs 94 and the spring fingers 90 extend outwardly between the ribs toward the lamp receptacles 42. The edges of the arms 88 have a sliding engagement with the sides 96 of the openings 94 so that the contact plate 56 provides a nonrotatable driving connection between the pushnut 84 and the lamp holder 38. The spring fingers 90 resiliently engage the upper terminals 98 of lamps 100 mounted in the receptacles 42. The lower contact plate 58 is inverted with respect to the upper plate 56 and assembled to the bottom of the lamp holder 38 in the same manner that the contact plate 56 is assembled to the top of the holder. The spring fingers 90 on the lower contact plate engage the lower terminals 102 on the lamps 100. As can be seen in FIG. 1, when the lamps 100 are mounted on the holder 38 the contact fingers 90 on the contact plates are forced inwardly so that there is a good spring engagement between the plates and the terminals on the lamps. It will be appreciated that the contact plates 56 and 58 are easily assembled on the holder 38 and provide good electrical connection to the terminals on the lamps 100 without using separate screws, or soldering, to form the electrical connections.

Figure 2:
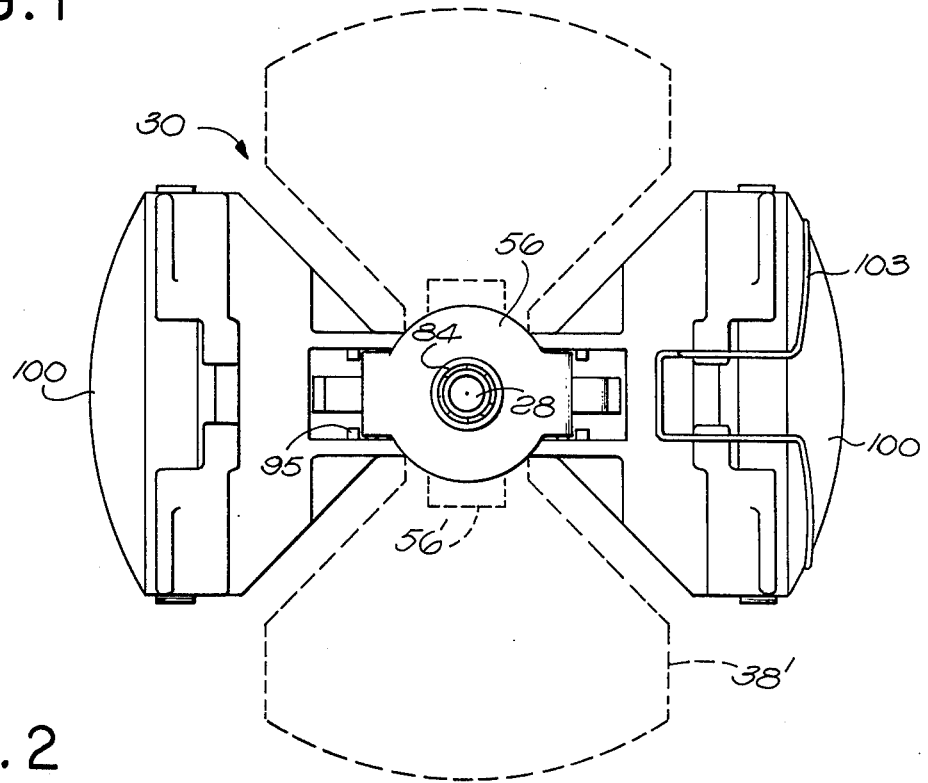
FIG. 2 is a top plan view of the lamp holder illustrated in FIG. 1, with a second identical lamp holder being illustrated in dotted lines mounted on the first holder showing how a four lamp holder assembly may be constructed.

Wire spring clips 103 pivotally mounted at their lower ends to the receptacles 42 serve to releasably hold the lamps 100 in the receptacles. Only one of such clips is illustrated in FIGS. 1 and 2. Such a spring clip is described in detail in the aforementioned Gosswiller patent.

The lower contact plate 58 also functions as a slip ring for engaging a brush 104 carried by the motor bracket 14. The brush 104, which may be made of copper graphite, or the like, is connected to a U-shaped spring clip 106. The lower end of the clip is fixedly connected to the upper leg 16 of the motor bracket 14 by an insulated screw 108 and nut 109. A power input lead 110 has a terminal 111 electrically connected to the screw 108. A lead 112 connected to the positive power input terminal of the motor 22 terminates in a terminal 113 electrically connected to the screw 108 below the terminal 111. A lock washer 114 may be interposed between the nut 109 and the terminal 113. Plastic washers 115 are mounted on the screw to separate the spring clip 106 and terminal 111 from the bracket 14. The insulated screw 108 and plastic washers 115 electrically isolate the screw from the bracket so that power may be conducted from the lead 110 via the screw 108 and spring clip 106 to the brush 104. The spring clip biases the brush 104 into engagement with the lower surface of the lower contact plate 58. Thus, it will be appreciated that the lower contact plate 58 functions as the conductor electrically connecting the lower terminals 102 of the lamps 100 as well as a slip ring. Furthermore, since the slip ring is located above the brush 104, contaminants may not collect thereon to adversely affect the electrical connection between the brush and the ring as occurs in prior art rotatable lamp assemblies.

The power to the lamps 100 comes from the lead 110 through the brush 104 and lower contact plate 58 to the terminals 102, and passes out through the terminals 98, the upper contact plate 56, the pushnut 84, and the shaft 28 to the motor bracket 14 and the vehicle body, which constitutes the ground.

The rotatable lamp assembly 30 described hereinabove, and illustrated in FIG. 1, is utilized when only a pair of lamps 100 are required in the signal light 10. If three or four lamps are desired, the spacer 60 may be removed and a second lamp holder 38', identical to the holder 38, may be mated therewith, one inverted and rotated 90° relative to the other, as shown in dotted lines in FIG. 2. With two lamp holders so mated, the central mounting portion 52 of each holder is disposed in the recess 48 of the other holder, and the respective upper and lower surfaces of the mated holders are coplanar. A second pair of upper and lower contact plates, identical to the plates 56 and 58 are mounted on the top and bottom of the lamp holder assembly and rotated 90°, as shown at 56' in FIG. 2. Thus, it will be appreciated that by the present invention, either a two or four lamp signal light may be constructed utilizing identical, interchangeable parts, thereby greatly reducing manufacturing costs and assembly time.

In view of the foregoing, it is seen that by the present invention there is provided a novel signal light having a relatively simple design, utilizing a minimum number of parts, and further incorporates certain identical parts so that assembly and inventory costs are significantly reduced over prior art rotatable signal lights.

What is claimed is:

1. A rotating signal light comprising:
   a vertically disposed rotatable shaft;
   motor means for rotating said shaft;
   a one-piece insulative lamp holder mounted on said shaft and having a plurality of lamp receiving receptacles thereon, each said receptacle being shaped to support a lamp therein;
   said lamp holder having upper and lower surfaces;
   upper and lower contact plates;
   said upper contact plate being mounted directly on said upper surface and said lower contact plate being mounted directly on said lower surface;
   means providing a driving connection between said shaft and said lamp holder;
   means providing a sliding electrical connection to said lower contact plate; and
   said contact plates having spring contact fingers adjacent to said receptacles for electrically, resiliently engaging terminals on lamps in said receptacles.

2. A rotating signal light as set forth in claim 1 wherein:
   a fixed base supports said shaft;
   said sliding electrical connection means comprises a conductive brush fixed to said base and biased into engagement with the lower surface of said lower contact plate.

3. A rotating signal light comprising:
   a vertically disposed rotatable shaft;
   motor means for rotating said shaft;
   a one-piece insulative lamp holder rotatably mounted on said shaft and having a plurality of lamp receiving receptacles thereon, each said receptacle being shaped to support a lamp therein, said lamp holder having upper and lower surfaces;
   upper and lower contact plates mounted directly on said upper and lower surfaces, respectively, and being non-rotatable relative to said lamp holder;
   means providing a driving and electrical connection between said shaft and said upper contact plate;
   means providing a sliding electrical connection to said lower contact plate; and
   said contact plates having means adjacent to said receptacles for electrically engaging terminals on lamps in said receptacles.

4. A rotating signal light comprising:
   a vertically disposed rotatable shaft;
   motor means for rotating said shaft;
   a one-piece insulative lamp holder mounted on said shaft and having a plurality of lamp receiving receptacles thereon, each said receptacle embodying upper and lower outwardly diverging lamp supporting surfaces arranged to allow a lamp to be inserted horizontally into said receptacle;
   upper and lower contact plates non-rotatably mounted on said lamp holder;
   means providing a driving and electrical connection between said shaft and one of said contact plates;
   means providing a sliding electrical connection to the other contact plate; and
   said contact plates having spring contact fingers adjacent to said receptacles for electrically, resiliently engaging terminals on lamps in said receptacles.

5. A signal light as set forth in claim 4 including:
   movable retention means on said lamp holder adjacent to each said receptacle for releasably retaining a lamp in said receptacle.

6. A signal light as set forth in claim 5 wherein:
   each said retention means is a pivotally mounted spring retention clip.

7. A rotating signal light comprising:
   a vertically disposed rotatable shaft;
   motor means for rotating said shaft;
   an elongated, one-piece insulative lamp holder mounted on said shaft and having a plurality of lamp receiving receptacles thereon at its opposite ends, each said receptacle being shaped to retain a lamp therein;
   said lamp holder having upper and lower surfaces, a pair of sidewalls and a downwardly opening, transversely extending recess therein between said receptacles opening at said sidewalls, the bottom of said recess being located at an equal distance from said upper and lower surfaces, said recess defining thereabove a central mounting portion;
   said mounting portion having a vertical bore therein receiving said shaft;
   upper and lower contact plates on the top and bottom, respectively, of said lamp holder; and
   a removable spacer in said recess surrounding said shaft and extending from said lower contact plate to said mounting portion.

8. A rotating signal light comprising:
   a vertically disposed rotatable shaft;
   motor means for rotating said shaft;
   an insulative lamp holder assembly mounted on said shaft, said assembly comprising two identical elongated lamp holders extending transversely relative to each other;
   each said lamp holder having a lamp receiving receptacle at its opposite ends and a recess in one side between said receptacles defining a central mounting portion on the opposite side of the holder, said mounting portion having a vertical bore therein;
   said lamp holders being inverted relative to each other with the mounting portion of each holder being mounted in the recess of the other holder, and with said bores vertically aligned;
   said shaft extending into said bores; and upper and lower contact plates on the top and bottom, respectively, of said lamp holder assembly.

9. A rotating signal light comprising:
a vertically disposed rotatable shaft;
motor means for rotating said shaft;
a one-piece insulative lamp holder mounted on said shaft and having a plurality of lamp receiving receptacles thereon, each said receptacle being shaped to support a lamp therein;
said lamp holder being elongated and embodying a pair of sidewalls, a downwardly opening, transversely extending recess in said lamp holder located between said receptacles and opening at said sidewalls, said recess defining thereabove a central mounting portion;
said mounting portion having a vertical bore therein;
a second lamp holder identical to said first-mentioned lamp holder and assembled thereto;
said second lamp holder being inverted and extending transversely relative to said first lamp holder;
the central mounting portion of each said lamp holder being mounted in the recess of the other lamp holder, with the bores therein in vertical alignment and receiving said drive shaft;
upper and lower contact plates mounted on said lamp holders;
means providing a driving connection between said shaft and said lamp holders;
means providing a sliding electrical connection to said lower contact plate; and
said contact plates having spring contact fingers adjacent to said receptacles for electrically, resiliently engaging terminals on lamps in said receptacles.

10. A rotating signal light comprising:
a vertically disposed rotatable shaft;
motor means for rotating said shaft;
a one-piece insulative lamp holder rotatably mounted on said shaft and having a plurality of lamp receiving receptacles thereon each said receptacle being shaped to support a lamp therein, said lamp holder having upper and lower surfaces;
said lamp holder being elongated and embodying a pair of sidewalls, a downwardly opening, transversely extending, rectangular recess in said lamp holder located between said receptacles and opening at said sidewalls, said recess defining thereabove a central mounting portion;
said mounting portion having a vertical bore therein;
said shaft extending into said bore;
upper and lower contact plates mounted directly on said upper and lower surfaces, respectively;
means providing a driving connection between said shaft and said lamp holder;
means providing a sliding electrical connection to said lower contact plate; and
said contact plates having means adjacent to said receptacles for electrically engaging terminals on lamps in said receptacles.

11. A signal light as set forth in claim 10 including:
a spacer in said recess surrounding said shaft, the length of said spacer being equal to the depth of said recess.

* * * * *